United States Patent [19]
Goss et al.

[11] Patent Number: 5,975,019
[45] Date of Patent: *Nov. 2, 1999

[54] CLUMPING ANIMAL LITTER

[75] Inventors: G. Robert Goss, Quincy; D. Cristina Frugoli, Mundelein, both of Ill.

[73] Assignee: Oil-Dri Corporation of America, Chicago, Ill.

[*] Notice: This patent is subject to a terminal disclaimer.

[21] Appl. No.: 08/914,406

[22] Filed: Aug. 19, 1997

[51] Int. Cl.⁶ .................................................. A01K 29/00
[52] U.S. Cl. .......................................................... 119/173
[58] Field of Search ................................. 119/171, 172, 119/173

[56] References Cited

U.S. PATENT DOCUMENTS

| | | | |
|---|---|---|---|
| Re. 33,983 | 7/1992 | Hughes | 119/173 |
| 2,531,427 | 11/1950 | Hauser | 220/448 |
| 3,586,478 | 6/1971 | Neumann | 23/111 |
| 3,789,797 | 2/1974 | Brewer | 119/1 |
| 5,094,189 | 3/1992 | Aylen et al. | 119/173 |
| 5,129,365 | 7/1992 | Hughes | 119/173 |
| 5,176,107 | 1/1993 | Buschur et al. | 119/173 |
| 5,188,064 | 2/1993 | House | 119/172 |
| 5,317,990 | 6/1994 | Hughes | 119/173 |
| 5,359,961 | 11/1994 | Goss et al. | 119/173 |
| 5,386,803 | 2/1995 | Hughes | 119/173 |
| 5,503,111 | 4/1996 | Hughes | 119/173 |
| 5,836,236 | 11/1998 | Goss et al. | 119/173 |

FOREIGN PATENT DOCUMENTS 0378421   7/1990   European Pat. Off. ....... A01K 1/015

Primary Examiner—Thomas Price
Attorney, Agent, or Firm—Olson & Hierl, LTD.

[57] ABSTRACT

A clumping animal litter utilizing the interparticle interaction of a swelling clay, such as sodium bentonite, in combination with a non-swelling clay material. Preferably, sixty percent (60%) by weight, or less, composition of sodium bentonite is used after the judicious selection of particle size distribution such that the mean particle size of the non-swelling clay material is greater than the mean particle size of the sodium bentonite. In addition, an organic clumping agent, such as a pregelatinized corn starch can be combined with the sodium bentonite/clay mixture to enhance clumping properties.

35 Claims, 1 Drawing Sheet

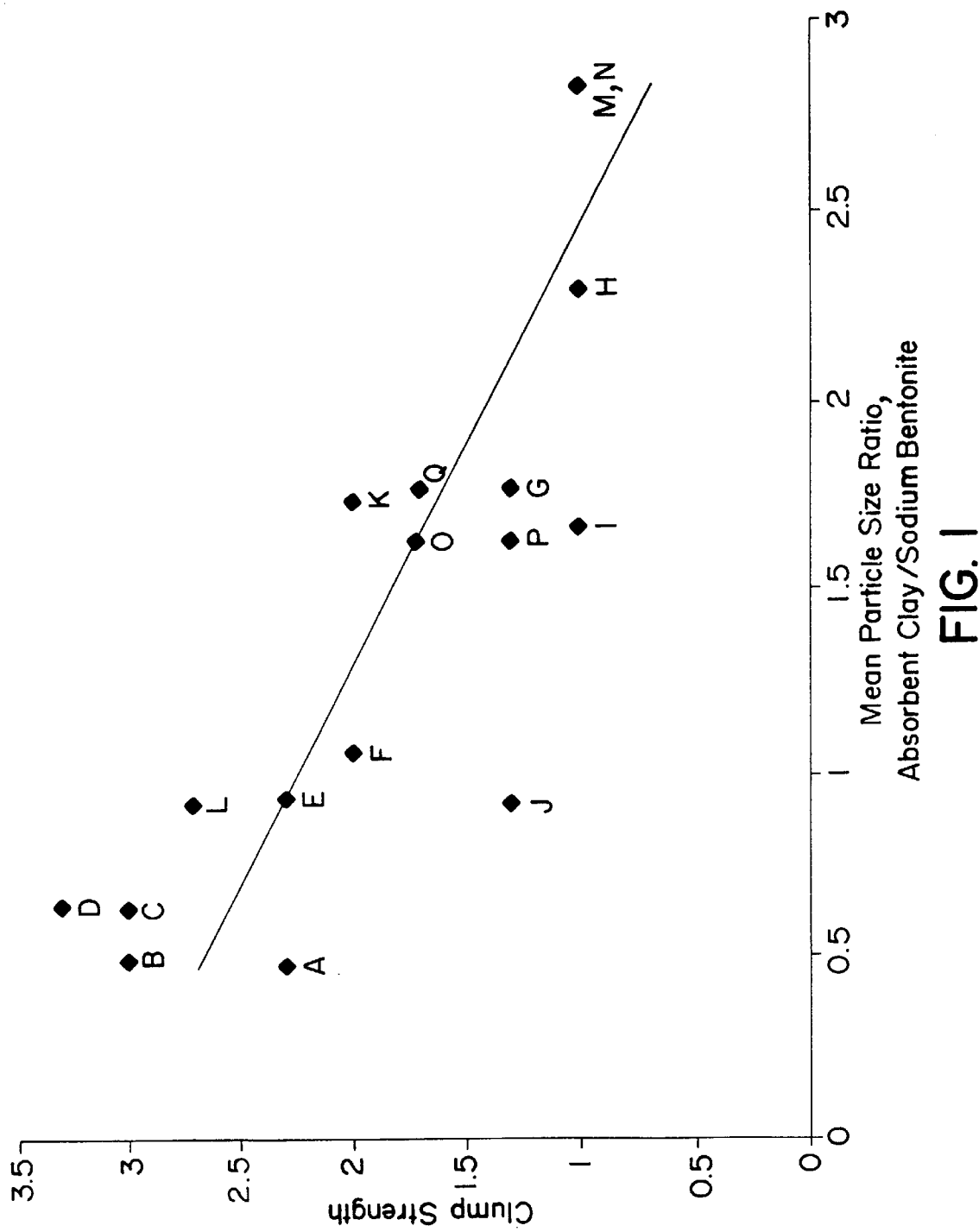

CLUMPING ANIMAL LITTER

TECHNICAL FIELD

This invention relates to clay-based compositions suitable for use as animal litter. In particular, the present invention is directed to a clump-forming, clay-based animal litter.

BACKGROUND OF THE INVENTION

In the past, much time, effort, and other valuable resources, have been expended in the development of animal litter, particularly for household pets, and especially cats. A material most widely utilized in animal litter is generally clay.

Clay particles provide small animals with dry, sanitary, dustless and relatively odorless litter. Clay materials are sorptive minerals characterized by low bulk density and layered lattice crystal structures. These minerals are derived from condensed forms of silicic acid, $H_4SiO_4$, where each silicon atom is surrounded by four oxygen atoms inducing a tetrahedral structure. Chains or two-dimensional sheets are formed when the tetrahedral structures are linked together by the sharing of common oxygen atoms. Clay materials are composed of such silica tetrahedral sheets with a central alumina octahedral sheet.

Through formational mismatching and distortion between the tetrahedral layers and impurities, diverse morphological and chemical properties are conferred to the clay. The absorption of water is one such phenomenon. Clumps of wetted litter permit easy and selective removal of odor-producing animal wastes for convenient disposal without having to replace the entire litter bed.

The irregular series of layers with corresponding interstitial space comprise pores. It is those spaces and pores which give clay its capacity to absorb and store water.

Another material that has found wide acceptance, particularly in clumping litter, is a swelling clay such as sodium (Na) bentonite. However, until the present invention, important nuances of sodium bentonite were either disregarded, unappreciated, or unforeseen by those skilled in the particular art.

Interparticle interaction enables sodium bentonite to clump. In order to clump properly the particles of sodium bentonite must be allowed to interact with one another. To insure such interaction is capable of taking place those skilled in the art have used weight percentages of sodium bentonite well in excess of 60 percent. This is, in part, because animal litter developers have in the past used blends of sodium bentonite and a non-clumping clay material in weight-to-weight ratios. However, a good clumping performance with a composition containing sixty-percent (60%) by weight or less of sodium bentonite heretofore was not readily attainable.

For example, U.S. Pat. No. Re. 33,983 and U.S. Pat. No. 5,503,111 to Hughes, each describe a method and composition for absorbing animal dross using at least about 65 percent by weight of water-swellable bentonite clay, based on the total amount of litter used.

Other clumping agents used in the prior art include polysaccharides, water-soluble gums, dry particulate cellulosic ethers and water-absorbent polymers. These additives require careful handling during manufacture, multiple processing steps and are costly. Further, in such animal litter, the dry particulate cellulosic ethers or the water-absorbent polymers tend to segregate from the particulate clay during handling and shipping because of differences in specific gravity.

Some prior attempts also have been made to overcome the shortcomings of swelling clays by utilizing non-swelling clay and starch as a binder, but such litters were slow clumping. For example, U.S. Pat. No. 5,094,189 to Aylen et al., describes a sorbent, non-swelling clay mixed with 0.2 to 2 percent pregelatinized, cationic starch binder but adhesion of the wetted agglomerates was fairly light and required a day or so to become fairly firm. Likewise, U.S. Pat. No. 5,176,107 to Buschur describes a sorbent, non-swelling clay litter composition utilizing 8 to 14 percent wheat starch paste as a liquid-activated adhesive binding agent which required several hours for the wetted clumps to harden fully. The inability to rapidly remove wetted clumps of animal waste to reduce or eliminate malodors associated therewith from the litter is undesirable.

The clumping effect of the present invention, as previously stated, is related to the interparticle interaction of the sodium bentonite material, particularly with the introduction of moisture.

Montmorillomite is the principal clay mineral of bentonite rock which originates from volcanic ash. Van Olphen, H., *An Introduction to Clay Colloid Chemistry*, 2nd ed., Wiley-Interscience Publication (1977); p.67. The ion rich composition of the wet material reduces the repulsion forces between the particles allowing the attractive forces—predominantly van der Waals forces, which are not affected by the ion concentration—to dominate. The result is, of course, clumping of the composition with the introduction of water. To increase the clumping effect, it was believed, would necessarily require an increase in the sodium bentonite amount which could interact. It has now been found that that is not necessarily the case.

SUMMARY OF THE INVENTION

Animal litter compositions having an effective clumping performance are constituted by a particulate absorbent non-swelling clay material and a particulate swelling clay such as sodium bentonite, wherein the mean particle size of the non-swelling clay material (no greater than 4 millimeters) is greater than the mean particle size of the swelling clay (no greater than 2 millimeters). A suitable match can be readily made where the combination of the selected materials provides a good clump at a less than sixty weight percent (60 wt-%) of sodium bentonite provided the particle size distribution requirements are satisfied.

The particle size of the two primary materials can be preselected such that the mean particle size ($\bar{u}$) of the clay material is greater than the mean particle size ($\bar{u}$) of the swelling clay. Preferably, the non-swelling clay material has a similar specific gravity to that of the swelling clay.

This judicious selection process provides a composition in which a substantially larger number of swelling clay particles is present while the total amount of swelling clay present in the litter composition is relatively low. The swelling clay particles are therefore able to interact efficiently with adjacent absorbent particles to form clumps when contacted by moisture.

BRIEF DESCRIPTION OF THE DRAWING

FIG. 1 is a line graph, plotting each of the samples of the present invention set out in Table III, which illustrates the relationship between the clump strength at approximately 30 seconds after wetting occurs and the mean particle size ratio in a 50/50 blend of clay and sodium bentonite.

DESCRIPTION OF THE PREFERRED EMBODIMENT

While the present invention is susceptible to embodiments in many different forms, the preferred embodiment of the invention is described below. It should be understood, however, that the present disclosure is to be considered as an exemplification of the principles of the invention and is not intended to limit the invention to the specific embodiments illustrated.

The compositions of the present invention are designed to create a usable animal litter which has greater clumping strength and permits more scoops per pound of litter.

The animal litter of this invention is in the form of a free-flowing admixture of particulate non-swelling clay material and swelling clay, and can, in an alternate embodiment, contain an organic clumping agent such as gums, e.g., galactomannan gums, or starch, cellulose esters or ethers, and the like. The litter generally forms a clump of durable clump strength substantially immediately, i.e., within about 30 seconds to about one minute, of being wetted with an aqueous liquid, such as water or animal urine. The term "durable clump strength" as used herein means that such a so-formed wetted clump has a firmness of sufficient structural integrity and hardness to withstand mechanical separation from the unwetted litter for disposal substantially immediately, i.e., within about 30 seconds to about one minute of being wetted and retains such firmness for a period of at least 24 hours. Clump strength can be evaluated objectively or subjectively by any number of conventional methods known in the animal litter arts.

Each embodiment discussed is composed of a specific non-swelling clay material and a swelling clay such as sodium bentonite, and can additionally include an organic clumping agent (see Tables IV and V for composition percentages). These elements are discussed individually herein before the several examples illustrating the present invention. Compositions described herein are expressed as "weight percent" (or percent by weight), which unless otherwise noted is calculated based upon the total weight of the animal litter.

With respect to the non-swelling clay material, any of the commonly known clays will suffice. The animal litter composition should comprise at least about 40 percent by weight of the non-swelling clay material.

Non-swelling clay material, at least in part, contains an earthy material composed primarily of hydrous aluminum silicates and is different from the swelling clays that are capable of absorbing several times their weight of an aqueous liquid. Relatively small amounts of non-clay materials can also be present. The non-swelling clay material is usually derived from a naturally occurring raw material, but synthetic non-swelling clay materials are also suitable.

An absorbent clay material which is particularly useful in practicing the present invention is a non-swelling smectite, i.e., a clay composed of units constituted by two silica tetrahedral sheets with a central alumina octahedral sheet. See, for example, Grim, 2nd ed., McGraw-Hill, Inc., New York, N.Y. (1968). pp 77-78. Smectite-attapulgite mixtures can also be used for this purpose.

It is common for individual clay particles to change in volume to some extent when absorbing an aqueous liquid. Typically, the "non-swelling" clays only expand so that a fully hydrated clay particle occupies less than about 150 percent of the volume that the particle occupied in an anhydrous state.

The smectite family of clays includes the various mineral species montmorillonite, nontronite, hectorite and saponite, all of which can be present in the clay mineral in varying amounts. These clays can range in color from a cream or grey off-white to a dark reddish tan color. Such smectites are frequently referred to in the trade under designations as Mississippi Grey, Mississippi Tan, Blue Mountain, and Georgia White. These clays contain calcium and/or magnesium in the form of exchangeable cations.

The clay constituent of the present compositions is in the form of discrete particles. These particles preferably are rounded in shape to facilitate bagging and handling, and have surfaces that are reasonably smooth to the touch so that an animal feels comfortable standing upon them.

The smectite clays used in several embodiments of the present invention include Blue Mountain Clay and Georgia White Clay. The clays were run through a particle sizing table using screen sizes from 6 mesh to 100 mesh, United States Sieve Series. The results are reported in Table I below.

From the particle size analysis the mean particle size ($\bar{u}$) of each clay sample was determined using Promesh graph paper. See, Falivene, P. J. Graph Paper for Sieve Analysis, CHEMICAL ENGINEERING: 87-88 (Feb. 23, 1981). The mean particle size ($\bar{u}$) for the non-swelling clay materials are also reported in Table I below.

TABLE I

Sieve Analysis of Non-Swelling Clay Material[1]

| Mesh | Blue Mtn. (1) | Georgia | Blue Mtn. (2) | Blue Mtn. 8/16 | Blue Mtn. 16/30 |
|---|---|---|---|---|---|
| 6 | — | — | — | 99.7 | — |
| 12 | — | — | — | 62.2 | — |
| 16 | — | — | 99.9 | 6.0 | — |
| 18 | 99.0 | 99.1 | 79.4 | — | 97.4 |
| 20 | 92.4 | 87.8 | 45.4 | — | 44.4 |
| 30 | 76.1 | 53.0 | 9.0 | — | 9.7 |
| 40 | 47.0 | 18.8 | 1.3 | — | — |
| 50 | 22.5 | 2.0 | — | — | — |
| 60 | 5.4 | 0.4 | — | — | — |
| 80 | — | — | — | — | — |
| 100 | 1.3 | — | — | — | — |
| $\bar{u}$ | 440 | 580 | 850 | 1600 | 850 |

[1]Numbers indicate the percentage of material passing through each screen.

In dramatic contrast to the non-swelling clay material, the swelling clays are typically capable of expanding more than 500 percent during hydration. Swelling clays not only expand in volume but they also become tacky when wetted, forming clumps of spent clay. A swelling clay is defined in the literature and in patents, such as in U.S. Pat. No. 3,586,478, as one which gives a Bingham Yield Value of at least 20 dynes/cm$^2$ as a 2 percent dispersion in water.

An example of a well known swelling clay is sodium bentonite, also called Wyoming bentonite. In a hydrated state, swelling clays often exhibit a tackiness which will cause adjacent particles of the swelling clay to agglomerate.

The tackiness of the swelling clay gives it a "glue-like" function in the clumping process. The cohesiveness of the clump is tied to the particle distribution of swelling clay within the clay blend that forms the clump. Naturally, the more "glue" the stronger the clump, but the present invention has found that a judicious distribution of a smaller amount of "glue" can also be effective. That is, the use of less swelling clay is possible because there is more effective distribution of the particles within the animal litter.

The sodium bentonite material used in the embodiments of the present invention was subjected to particle size analyses. The various samples shown below include WYO-Ben 20/40 ("20/40"), WYO-Ben 20/60 (2 samples: "20/60

(1)" and "20/60 (2)"), WYO-Ben 30/60 with fines ("30/60 w/fines") and without fines ("30/60 w/o"), WYO-Ben 40/80 ("40/80"), WYO-Ben FS-30 ("FS-30"), WYO-Ben FS-40 ("FS-40"), and American Colloid ("ACC"). Each test sample was run through a particle size separation table using 12 mesh to 325 mesh screen (U.S. Sieve Series).

The results of the sieve analysis are listed in Table II below. From the particle size distributions the mean particle size ($\bar{u}$) of each sample was determined using Promesh graph paper. See, Falivene, P. J. Graph Paper for Sieve Analysis, CHEMICAL ENGINEERING: 87-88 (Feb. 23, 1981).

TABLE II

Sieve Analysis of Sodium Bentonite[1]

| Mesh | ACC | FS-30 | FS-40 | 20/40 | 20/60 (1) | 20/60 (2) | 30/60 w/fines | 30/60 w/o | 40/80 |
|---|---|---|---|---|---|---|---|---|---|
| 12 | 100 | 100 | — | — | — | — | — | — | — |
| 16 | 88.6 | 86.5 | — | — | — | — | — | — | — |
| 18 | 68.3 | 64.3 | — | 99.8 | — | — | — | — | — |
| 20 | 37.6 | 34.7 | — | 57.8 | 99.5 | 99.1 | 99.9 | 99.9 | — |
| 30 | 11.0 | 8.2 | 90.0 | 13.1 | 61.2 | 66.8 | 67.5 | 61.8 | 99.9 |
| 40 | 3.3 | 1.4 | 80.4 | — | 24.8 | 34.6 | 36.1 | 24.9 | 60.8 |
| 50 | 1.8 | — | — | — | 6.9 | 9.0 | 24.3 | 7.4 | 32.7 |
| 60 | — | — | 25.8 | — | — | 3.2 | 20.4 | — | 21.6 |
| 80 | — | — | — | — | — | — | 16.0 | — | 7.3 |
| 100 | — | — | — | — | — | — | 13.9 | — | — |
| 200 | — | — | 2.9 | — | — | — | 8.0 | — | — |
| 325 | — | — | — | — | — | — | 5.2 | — | — |
| $\bar{u}$ | 900 | 920 | 300 | 800 | 520 | 480 | 480 | 510 | 370 |

[1]Numbers reflect percentage of material passing through each screen.

Upon contact with an appropriate amount of an aqueous liquid, the innovative animal litter of this invention autogenously forms a clump of durable clump strength within a matter of seconds. The so-formed clump is sufficiently durable for mechanical separation and removal (e.g., by use of a spoon, scoop, or small hand shovel) from a bed of otherwise substantially dry animal litter. The formed clump also remains substantially intact and durable for at least a 24 hour period. Thus, the animal litter of this invention provides the animal's caretaker with an opportunity to conveniently remove and dispose of the clump either subtantially immediately or at a later time.

PREPARATION OF SAMPLES

Samples were prepared to test clumping strength. The following samples as listed in Table III, below, were prepared as follows:

desired absorbent clay material based on mean particle size, as shown in Table I, was selected;

sodium bentonite based on mean particle size, as shown in Table II, was selected;

the amount of selected absorbent clay material was determined and recorded;

an amount of sodium bentonite approximately equal to weighed out clay material was combined with the absorbent clay material;

the ratio of mean particle size of the clay material to the mean particle size of sodium bentonite was calculated;

the obtained clay/bentonite compositions were spread in a tray to a depth of approximately 3 inches (approx. 7.6 centimeters);

about 20 ml of water was added to the composition in a small concentrated area to create clump;

after 30 seconds the clump was removed from the tray; and quality of the removed clump was evaluated.

TESTING OF SAMPLES

Each sample was then dropped from a vertical height of one foot (approximately 30.5 cm) onto a substantially solid surface. A number in the range of 1 to 5 was subjectively allocated to each sample based on the observed structural integrity of the clump after dropping (1 being highest, 5 being lowest). The cohesiveness of the clump (e.g., wet, brittle, cracked, etc.) was also noted, where appropriate, when the clump was removed from the remaining unwetted (unclumped) portion of the litter. A clump was given a clump strength rating of 1 when it remained substantially intact on being dropped and given a clump strength rating of 5 when it completely fell apart on being dropped.

The ratio of mean particle size (e.g., the ratio of the mean particle size of clay to the mean particle size of sodium bentonite) and the clump strength of each sample set is recorded in Table III, below.

TABLE III

Mean Particle Size Ratio and Clump Strength

| Sample Set | Clay | $\bar{u}$ | Na Bentonite | $\bar{u}$ | Ratio | Clump Strength[1] |
|---|---|---|---|---|---|---|
| A | BL | 440 | FS30 | 920 | .48 | 2.3/1.7 |
| B | BL | 440 | ACC | 900 | .49 | 3/3 |
| C | GA | 580 | FS30 | 920 | .63 | 3/3.7 |
| D | GA | 580 | ACC | 900 | .64 | 3.3/2.7 |
| E | BL(2 | 850 | FS30 | 920 | .92 | 2.3/— |
| F | BL(2 | 850 | 20/40 | 800 | 1.06 | 2/1.3 |
| G | BL(2 | 850 | 30/60 w/fines | 480 | 1.77 | 1.3/1 |
| H | BL(2 | 850 | 40/80 | 370 | 2.3 | 1/1 |
| I | BL(2 | 850 | 30/60 | 510 | 1.67 | 1/1 |
| J | 16/30 | 850 | FS-30 | 920 | .92 | 1.3/1.7 |
| K | 8/16 | 160 | FS-30 | 920 | 1.74 | 2/1.3 |
| L | 16/30 | 850 | FS-30 | 920 | .92 | 2.7/2.7 |
| M | 16/30 | 850 | FS-40 | 300 | 2.83 | 1/1 |
| N | BL(2 | 850 | FS-40 | 300 | 2.83 | 1/1 |
| O | BL(2 | 850 | 20/60(1) | 520 | 1.63 | 1.7/1.7 |
| P | 16/30 | 850 | 20/60(1) | 520 | 1.63 | 1.3/1 |
| Q | BL(2 | 850 | 20/60(2) | 480 | 1.77 | 1.7/1.7 |

[1]Clump Strength is reported as an average for three tested clumps at two different times: 30 seconds/24 hours.

Referring now to FIG. 1, the clump strength (y-axis) can be seen plotted against the mean particle size ratio (x-axis).

The results of the testing clearly show a correlation between the two parameters. Sample sets A, B, C, D, E, F, and L all had mean particle size ratios of less than 1 (except for F which had a mean particle size of 1.06) and appear on FIG. 1 at the high end (at or above 2) on the clump strength axis (indicating a poorer quality clump).

Sample sets G, O, P, and Q all had mean particle size ratios of greater than 1 but less than 2. These sample sets scored much better on the clump strength drop test—each coming in at under 2. Sample set K scored slightly high on the clump strength scale (2) for its relatively moderate particle size ratio of 1.74. Similarly, sample sets I and J scored better than theorized on the clump strength scale (I—1.0; J—1.3) for their particle size ratios of 1.67 and 0.92, respectively.

Finally, sample sets H, M, and N while recording the highest three mean particle size ratios of all tested samples (H—2.3; M and N—2.83), each performed well on the clump strength drop test, achieving average scores of about 1. The range of preferred ratios is about 1.1:1 to about 4:1 (non-swelling clay-to-swelling clay), and most preferably about 2:1 to about 3:1 (non-swelling clay-to-swelling clay).

Although there is some scatter in the accumulated data, as shown in FIG. 1, the relationship between the mean particle size ratio and clump strength for the above data is linear (as represented by the line: y=−0.842x+3.0772) with a 99 percent probability of a correlation.

A third component, which can be included, in varying percentages, in any of the samples of Table III, is an organic clumping agent, such as, but not limited to, a pregelatinized starch. Processed cellulosic adhesives, polyelectrolytes, and cellulosic ethers such as Methocel™ and the like, can also be utilized as suitable clumping agents.

The starch can be obtained from any natural cereal, root or pitch source. Preferably, the starch is pregelatinized corn starch, which does not require the heating and swelling process that must be carried out on raw starches prior to bonding them to the litter material, however, it is not limited thereto. Wheat paste can also be a suitable pregelatinized starch. The starch, if used, can be admixed with the clay constituents of the animal litter as by dry blending to form an intimate, homogeneous free-flowing admixture utilizing conventional dry blender equipment.

Table IV below illustrates the advantages of using a starch, which can be in the range of about 0.25 percent by weight to about 6 percent by weight of the animal litter, with the 50/50 clay/sodium bentonite compositions.

TABLE IV

Effects of Starch on Clump Strength of 50/50 Compositions

| 50/50 Composition | weight % Starch[1] | Avg. Clump Strength[1] |
|---|---|---|
| FS-30/BL | 0 | 2.3/— |
| | 0.5 | 1.3/1 |
| | 0.75 | 1/1 |
| | 1 | 1/1 |
| | 1.25 | 1/1 |
| FS-30/GA | 0 | 3/3.7 |
| | 0.5 | 1.7/1.7 |
| | 0.75 | 2/1 |
| | 1 | 1.7/1 |
| | 1.25 | 1.3/1 |
| ACC/BL | 0 | 3/3 |
| | 0.5 | —/— |
| | 0.75 | —/— |

TABLE IV-continued

Effects of Starch on Clump Strength of 50/50 Compositions

| 50/50 Composition | weight % Starch[1] | Avg. Clump Strength[1] |
|---|---|---|
| | 1 | 1.3/1 |
| | 1.25 | 1.3/1 |
| ACC/GA | 0 | 3.3/2.7 |
| | 0.5 | 1.7/1 |
| | 0.75 | 1.7/1 |
| | 1 | 1.7/1 |
| | 1.25 | —/— |

[1]Pregelatinized corn starch
[2]Average for three clumps using one foot vertical drop test (as described above) at times of 30 seconds/24 hours.

As the results of Table IV clearly indicate, the clump strength of 50/50 compositions is improved with the addition of the pregelatinized corn starch as an organic clumping agent. While the amount of the starch used in the above tests was up to about 1.25 percent by weight, up to about 6 percent by weight of pregelatinized starch, based on the weight of the animal litter, can be added to improve clumping in 50/50 compositions.

In accordance with a further goal of the present invention, compositions containing less than 60 percent by weight of sodium bentonite (and in fact, less than 50 percent by weight) and a relatively small amount of starch (about 0.2 to about 6.0 percent by weight) have yielded "good" clumping results. Following the sample preparation procedures set out above, and adding various amounts of pregelatinized corn starch as a binder to different litter compositions before the introduction of the liquid (as a simulation of animal waste), additional samples for drop testing were obtained. The results of these test are shown in Table V below.

TABLE V

Effects of Starch on Compositions of Less Than 50% by Weight Sodium Bentonite

| Wt. Percent Starch | Wt. Percent Na Bentonite | Wt. % Clay | Clump Strength (30 sec.)[1] | Clump Strength (24 hrs.)[1] |
|---|---|---|---|---|
| | FS-30 | BL Clay | | |
| 0.5 | 40 | 60 | 2.7 | 1 |
| | 30 | 70 | 2.7 | 2 |
| 0.75 | 40 | 60 | 1 | 1 |
| | 30 | 70 | 1.7 | 1 |
| 1 | 40 | 60 | 2 | 1 |
| | 30 | 70 | 2.3 | 1.3 |
| 1.25 | 40 | 60 | 1 | 1 |
| | 30 | 70 | 1.3 | 1 |
| | 20 | 80 | 1.3 | 1 |
| | 10 | 90 | 2 | 1 |
| | GA Clay | | | |
| 0.5 | 40 | 60 | 2 | 1.3 |
| | 30 | 70 | 2.3 | 2.7 |
| | 20 | 80 | 3.3 | 2.7 |
| 0.75 | 40 | 60 | 2.3 | 2 |
| | 30 | 70 | 2.3 | 2.3 |
| 1 | 40 | 60 | 2.7 | 2 |
| | 30 | 70 | 3.7 | 2.3 |
| 1.25 | 40 | 60 | 1.7 | 1.3 |
| | 30 | 70 | 2 | 1.3 |
| | 20 | 80 | 2.7 | 2 |
| | ACC | BL Clay | | |
| 0.5 | 40 | 60 | 1.3 | 1 |
| | 20 | 80 | 3 | 2.7 |
| 0.75 | 40 | 60 | 1.3 | 1 |

TABLE V-continued

Effects of Starch on Compositions of Less Than 50% by Weight Sodium Bentonite

| Wt. Percent Starch | Wt. Percent Na Bentonite | Wt. % Clay | Clump Strength (30 sec.)[1] | Clump Strength (24 hrs.)[1] |
|---|---|---|---|---|
|  | 20 | 80 | 2.3 | 1 |
|  | 10 | 90 | 2.7 | 1.7 |
| 1 | 40 | 60 | 1.3 | 1 |
|  | 20 | 80 | 2.3 | 1 |
| 1.25 | 30 | 70 | 1.3 | 1 |
|  | 20 | 80 | 2 | 1 |
|  |  | GA Clay |  |  |
| 0.5 | 40 | 60 | 1.7 | 1 |
|  | 20 | 80 | 2.7 | 1.3 |
| 0.75 | 30 | 70 | 2 | 1 |
| 1 | 30 | 70 | 2 | 1 |
| 1.25 | 40 | 60 | 1.7 | 1 |
|  | 20 | 80 | 2 | 1 |

[1]Average clump strength of three (3) samples.

With few exceptions, the sodium bentonite/absorbent clay compositions of less than 50/50 clumped well at 30 seconds and at 24 hours. Clumping was enhanced by the addition of starch, especially in compositions of less than 40 percent by weight of sodium bentonite. The Wyo-Ben FS-30 and the Blue Mountain Clay produced strong clumps, relative to the other samples, using at least 0.75 weight percent of starch.

The foregoing discussion and the accompanying examples are presented as illustrative, and are not to be taken as limiting. Still other variations within the spirit and scope of this invention are possible and will readily present themselves to those skilled in the art.

I claim:

1. A clumping animal litter comprising:
   a. a particulate non-swelling clay material having a predetermined mean particle size no greater than about 4 millimeters; and
   b. a particulate swelling clay having a predetermined mean particle size no greater than about 2 millimeters, wherein the mean particle size of the non-swelling clay material is greater than the mean particle size of the swelling clay.

2. The animal litter of claim 1 wherein the swelling clay is sodium bentonite.

3. The animal litter of claim 1 wherein the non-swelling clay material is smectite.

4. The animal litter of claim 1 wherein the ratio of the mean particle size of the non-swelling clay material to the mean particle size of the swelling clay is within the range of about 1.1:1 to about 4:1.

5. The animal litter of claim 4 wherein the ratio of the mean particle size of the non-swelling clay material to the mean particle size of the swelling clay is preferably within the range of about 2:1 to about 3:1.

6. The animal litter of claim 1 wherein the non-swelling clay material is at least about 40 percent by weight of the animal litter.

7. The animal litter of claim 6 wherein the non-swelling clay material is preferably about 60 percent by weight of the animal litter.

8. The animal litter of claim 6 wherein the non-swelling clay material has a particle size in the range of about 6 mesh to about 100 mesh, U.S. Sieve Series.

9. The animal litter of claim 1 wherein the swelling clay is at most about 60 percent by weight of the animal litter.

10. The animal litter of claim 9 wherein the swelling clay is preferably about 40 percent by weight of the animal litter.

11. The animal litter of claim 9 wherein the swelling clay has a particle size in the range of about 12 mesh to about 325 mesh, U.S. Sieve Series.

12. The animal litter of claim 11 wherein the swelling clay has a particle size preferably in the range of about 16 mesh to about 80 mesh, U.S. Sieve Series.

13. The animal litter of claim 1 and further comprising an organic clumping agent.

14. The animal litter of claim 13 wherein the clumping agent is a cellulosic ether.

15. The animal litter of claim 13 wherein the clumping agent is a polyelectrolyte.

16. The animal litter of claim 13 wherein the organic clumping agent is in an amount in the range of about 0.25 percent by weight to about 6 percent by weight, based on the weight of the animal litter.

17. The animal litter of claim 13 wherein the clumping agent is a pregelatinized starch.

18. The animal litter of claim 17 wherein the pregelatinized starch is in an amount in the range of about 0.25 percent by weight to about 6 percent by weight, based on the weight of the animal litter.

19. The animal litter of claim 17 wherein the pregelatinized starch is corn starch.

20. The animal litter of claim 19 wherein the corn starch is in an amount in the range of about 0.5 percent by weight to about 6 percent by weight, based on the weight of the animal litter.

21. A clumping animal litter comprising:
   a. a particulate non-swelling clay material in the amount of at most about 60 percent by weight of the animal litter, the material having a predetermined mean particle size;
   b. a particulate swelling clay in the amount of at least about 40 percent by weight of the animal litter, the material having a predetermined mean particle size, and wherein the mean particle size of the non-swelling clay material is greater than the mean particle size of the swelling clay;
   c. an organic clumping agent in an amount within the range of about 0.25 percent by weight to about 6 percent by weight of the animal litter; and
   d. wherein the ratio of the mean particle size of the non-swelling clay material to the mean particle size of the swelling clay is within the range of more than about 1:1 to about 4:1.

22. The animal litter of claim 21 wherein the swelling clay is sodium bentonite.

23. The animal litter of claim 22 wherein the swelling clay is preferably about 40 percent by weight of the animal litter.

24. The animal litter of claim 22 wherein the swelling clay has a particle size in the range of about 12 mesh to about 325 mesh, U.S. Sieve Series.

25. The animal litter of claim 21 wherein the non-swelling clay material is smectite.

26. The animal litter of claim 25 wherein the non-swelling clay material is preferably about 60 percent by weight of the animal litter.

27. The animal litter of claim 21 wherein the clumping agent is a pregelatinized starch.

28. The animal litter of claim 27 wherein the pregelatinized starch is corn starch.

29. The animal litter of claim 21 wherein the ratio of the mean particle size of the non-swelling clay material to the mean particle size of the swelling clay is preferably within the range of about 2:1 to about 3:1.

30. A method for making a clumping animal litter comprising the steps of:
   a. combining a particulate non-swelling clay material with a suitable particulate swelling clay to form a composition wherein the mean particle size of the particulate non-swelling clay material is greater than the mean particle size of the particulate swelling clay;
   b. mixing the composition to effect a substantially uniform distribution of the two materials;
   c. packaging a quantity of the mixed composition.

31. The method of claim 30 and further comprising the step of adding an organic clumping agent after the step of combining.

32. The method of claim 30 wherein the step of combining comprises the step of utilizing at most about 60 percent by weight of the swelling clay, based on the weight of the animal litter.

33. The method of claim 31 wherein the step of adding an organic clumping agent comprises a pregelatinized corn starch.

34. The method of claim 31 wherein the step of adding an organic clumping agent comprises a polyelectrolyte.

35. The method of claim 34 wherein the step of combining comprises the step of utilizing at least about 40 percent by weight of the non-swelling clay material, based on the weight of the animal litter.

* * * * *